H. M. SCHEIBE.
RELAY SWITCH.
APPLICATION FILED JAN. 21, 1909.
959,613.
Patented May 31, 1910.
2 SHEETS—SHEET 1.
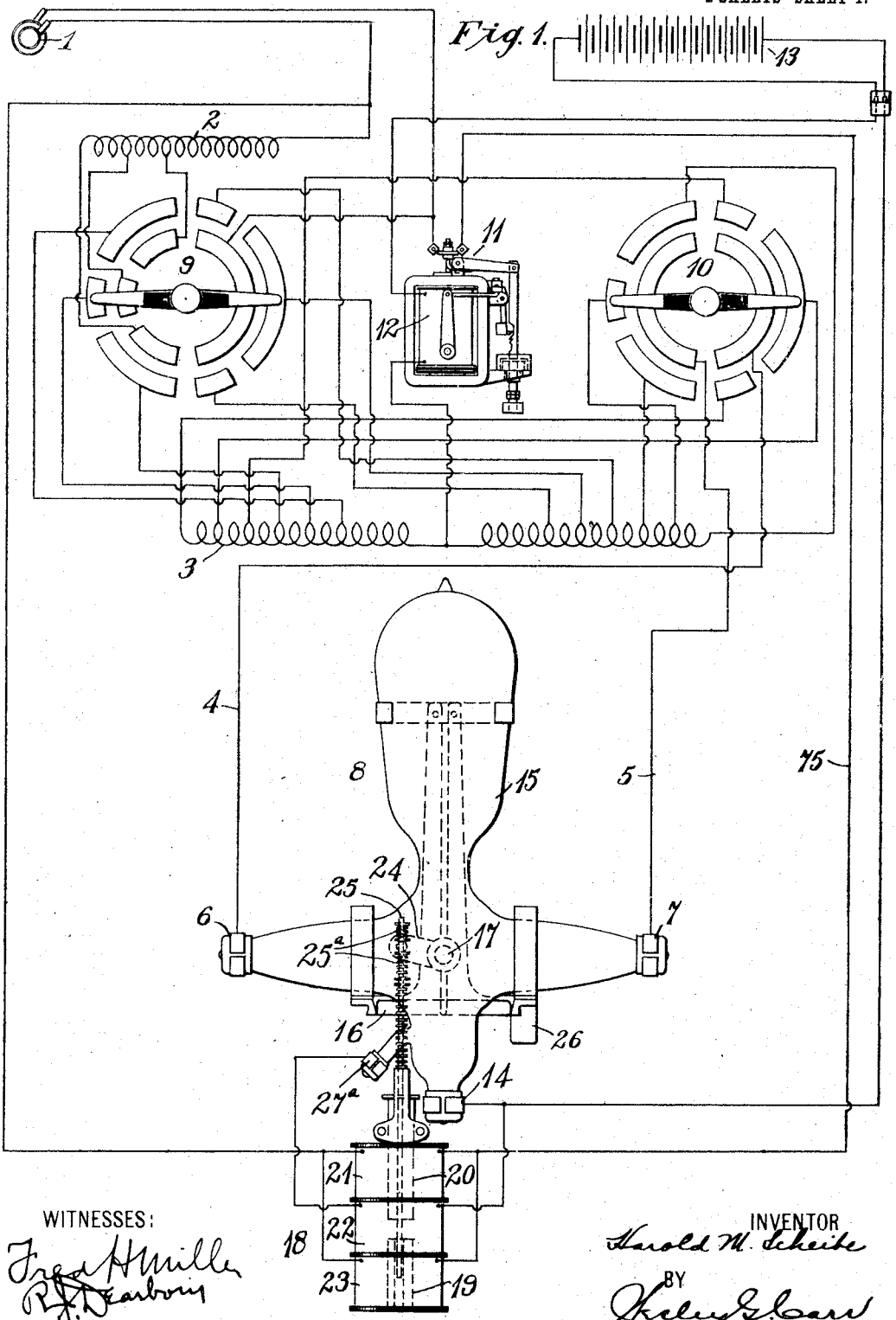

H. M. SCHEIBE.
RELAY SWITCH.
APPLICATION FILED JAN. 21, 1909.
959,613.
Patented May 31, 1910.
2 SHEETS—SHEET 2.
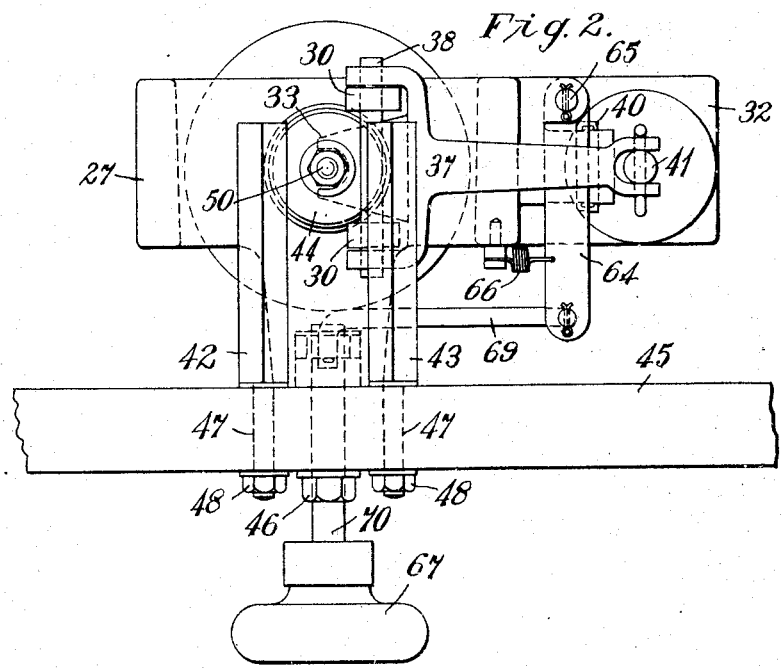
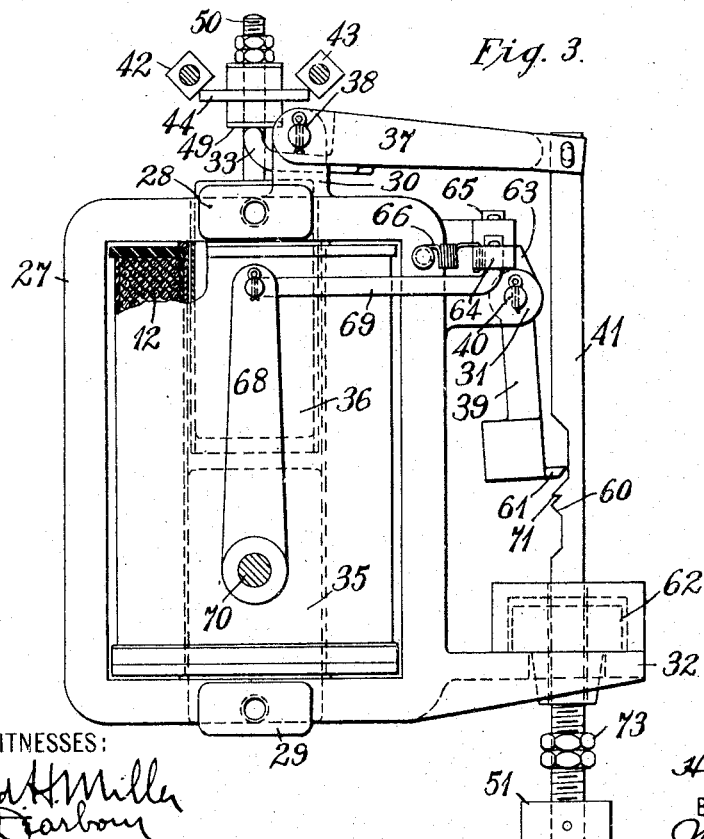
WITNESSES:
INVENTOR
Harold M. Scheibe
BY
ATTORNEY

UNITED STATES PATENT OFFICE.

HAROLD M. SCHEIBE, OF WILKINSBURG, PENNSYLVANIA, ASSIGNOR TO WESTINGHOUSE ELECTRIC & MANUFACTURING COMPANY, A CORPORATION OF PENNSYLVANIA.

RELAY-SWITCH.

959,613.  Specification of Letters Patent.  Patented May 31, 1910.

Application filed January 21, 1909. Serial No. 473,544.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Relay-Switches, of which the following is a specification.

My invention relates to relay switches and it has for its object to provide a device of this character having special operating characteristics whereby it shall be adapted for automatically governing the starting and stopping of vapor rectifiers.

It is a well known fact that mercury vapor rectifying devices cease to operate if their alternating current supply circuits are broken or if the supply of energy is temporarily interrupted, from any cause. In order to avoid this great disadvantage, I provide means for automatically starting the rectifying process upon the renewed application of alternating current energy to the supply circuit.

My relay is also so arranged as not to restart the rectifying process when it has stopped under predetermined conditions in the direct current circuit which is supplied from the rectifier. For example, if a mercury vapor rectifying device is employed for charging a storage battery, my improvement may be utilized, in lieu of an attendant, for automatically restarting the rectifying process upon its accidental discontinuance and for allowing the rectifying process to stop when the battery is charged to a predetermined degree.

Figure 1 of the accompanying drawings is a diagrammatic view of a battery charging system embodying my invention and Figs. 2 and 3 are, respectively, a plan view and a front elevation of a relay switch constructed in accordance with my invention.

Referring to Fig. 1 of the drawings, alternating current energy may be supplied from any convenient source, such as the generator 1, through a reactance 2, an auto transformer 3 and circuit conductors 4 and 5, to terminals 6 and 7 of the rectifying device 8. Regulating dials 9 and 10 are adapted to so vary the circuit connections of the auto transformer 3 as to adjust the alternating current voltage impressed upon the rectifier. A relay switch 11 is introduced in a circuit conductor 75 which supplies energy for tilting the rectifier bulb and its coil 12 is connected in series with the direct current circuit of the rectifier which may be connected to the terminals of the storage battery 13 or to some other suitable load, one terminal of the circuit being connected to the middle point in the auto transformer 3 and the other being connected to the direct current terminal 14 of the rectifier.

The rectifier comprises a substantially cruciform bulb 15, a supporting frame 16 therefor which is pivotally mounted on a shaft 17, a starting or tilting magnet 18 having stationary and movable core members 19 and 20 and coils 21, 22 and 23. The frame 16 is provided with a crank projection 24 which is resiliently connected to the movable core member 20 by a rod 25 and springs 25$^a$, the arrangement of parts being such that when the coils 21 and 23 are energized, the rectifier will be so tilted, in opposition to a counter weight 26, that the mercury within the rectifier bulb will form a circuit connection between the direct current terminal of the rectifier and a starting terminal 27$^a$ in a well known manner.

Referring to Figs. 2 and 3 of the drawings, the relay switch, which is here shown on a larger scale, comprises a substantially rectangular magnetizable frame 27 having lugs 28 and 29 projecting laterally from its respective ends, ears 30 on its upper end and ears 31 and bracket 32 on one side, coil 12, stationary and movable core members 35 and 36, a lever 37 fulcrumed on a shaft 38 that is supported by the ears 30, a latch arm 39 pivotally suspended from the ears 31 by a pin 40, a weight-bearing rod 41 pivotally suspended from the outer end of the lever 37, stationary contact terminals 42 and 43 and a movable bridging contact member 44 that is operatively connected to the core member 36.

The frame 27 is fastened to a plate or slab 45 by bolts 46, which extend through the slab and are screw-threaded into the lugs 28 and 29. The stationary contact terminals 42 and 43 are provided with shank projections 47 which extend through the slab 45 and are screw-threaded to receive nuts 48. The inner end of the lever 37 is provided with a bifurcated projection 33 which is adapted to engage the under side of washer 49 on the rod 50 which projects from the core member 36 in order that a weight 51 on the rod 41 may normally tend to move the bridging contact member 44 into engagement with the stationary contact terminals 42 and 43. The rod 41 on which the weight 51 is suspended, is provided with a notched projection 60 which is engaged, under predetermined conditions, by a finger 61 at the lower end of the arm 39.

A floating weight 62 is loosely mounted on the rod 41 above the bracket 32, upon which it rests except when the magnet winding 12 is energized to a predetermined degree. The arm 39 is provided with a projection 63 to be engaged by a lever 64 which is pivotally mounted on a stationary shaft 65, the lever being normally in such position that the arm 39 is free to assume the position which is determined by its center of gravity. The lever 64 may be rotated in opposition to a spring 66 by means of a handle grip 67 which acts through a lever 68 and a connecting link 69, the handle being attached to the outer end of a shaft 70 which projects through the plate or slab 45 and carries the lever 68 at its inner end. The arm 39 is so formed that the finger 61 tends to engage the notch 71 in the projection 60, but the contour of the projection is such that the finger will pass over the notch if the rod 41 is actuated rapidly in either direction.

The weight rod 41 is screw-threaded at its lower end and is provided with nuts 73 which are adapted to engage the lower end of the floating weight 62 after the movable core member of the electro-magnet has moved through a portion of its travel, and the arrangement of parts is such that the finger 61 comes into engagement with the notch 71 at this point. By this means, the weight rod 41 is latched either when the electro-magnet is energized by a current which is less than the predetermined value or when the magnet winding is partially deënergized, so that the weights are able to separate the stationary and movable core members, and the single weight at the lower end of the rod is not sufficiently heavy to continue the movement and to close the relay switch.

The operation of the system is as follows: Assuming that the rectifying process is in operation, the circuit connections being as indicated in Fig. 1, and that the storage battery is only partially charged, if the rectifying process is interrupted, for any reason, such as the interruption of the alternating current supply circuit, the relay switch will, of course, be closed, since the coil 12 will be deënergized by reason of the failure of the current traversing the direct current circuit of the rectifier. An alternating current circuit is therefore completed through the relay switch to the magnet coils 21 and 23 of the magnet 18, the energizing of which will be followed by a tilting of the rectifier bulb. The mercury contained in the bulb will then form a circuit connection between the terminals 14 and 27 of the rectifier and, by this means, the coil 21 will be short circuited, thereby choking down the magnetization across the air gap between the stationary and movable core members of the magnet and permitting the counter-weight 26 to return the rectifier to its normal operating position. The short circuit referred to above will thus be interrupted and an electric arc produced so that the alternating current voltage applied to the rectifier terminals may start the rectifying process in a well known manner. The action of the starting magnet will obviously be repeated if the rectifier fails to start.

The voltage applied to the rectifier bulb is so proportioned that, when the battery is fully charged, its counter-electromotive force will sufficiently oppose the direct current voltage of the rectifier to interrupt the rectifying process and to deënergize the relay switch. This occurs after the current has fallen below a predetermined limit which is not sufficient to keep the relay switch open in opposition to both of the weights and, consequently, the switch has moved toward its closed position until the weight 62 comes into engagement with the bracket 32, the parts having thus been brought to rest long enough for the projection 61 of the arm 39 to come into engagement with the notch 71. When the bulb drops out the relay is latched so that the circuit of the starting device is held open. In order to start the rectifier, it is now necessary to release the weight rod 41, which may be accomplished by rotating the handle 67. Thus it is apparent that the rectifying process may be automatically stopped and prevented from attempting to restart when the current traversing the direct current circuit falls gradually below a predetermined amount, although it will be automatically restarted if the rectifying process is interrupted under other conditions.

I claim as my invention:

1. A relay switch comprising a movable contact member, an actuating lever therefor, weights suspended from the lever and tending to close the switch, and means dependent upon a predetermined movement of the contact member from either its open or its closed position for holding the switch in an intermediate open position.

2. A relay switch comprising a movable contact member, an actuating lever therefor, weights suspended from the lever and tending to close the switch, and a latch which is dependent upon a predetermined movement of the contact member from either its open or its closed position for locking the switch in an intermediate open circuit position, a greater movement of the contact member being independent of the latch.

3. A relay switch comprising a stationary frame, stationary and movable core members, an opening coil, a lever pivotally mounted on the stationary frame and operatively connected to the movable member of the switch, a rod suspended from the lever and having a notched projection at one side, weights attached to the rod, an arm or latch suspended adjacent to the rod and provided with a finger, and means tending to force the finger into engagement with the notch in the rod.

4. A relay switch comprising a stationary frame, a movable core member, an opening coil associated with the core member, a lever pivotally mounted on the stationary frame and operatively connected to the movable member of the switch, a rod suspended from the lever and having a notched projection at one side, weights mounted on the rod, an arm or latch suspended adjacent to the rod and having a finger adapted to engage the notch in the rod at a predetermined intermediate position of the switch, one of said weights being carried by a projection of the frame when the switch occupies its open position and being picked up by the rod in said predetermined intermediate position of the switch.

In testimony whereof, I have hereunto subscribed my name this 13th day of January, 1909.

HAROLD M. SCHEIBE.

Witnesses:
   HAROLD B. TAYLOR,
   BIRNEY HINES.